(12) United States Patent
Urayama

(10) Patent No.: US 6,182,731 B1
(45) Date of Patent: Feb. 6, 2001

(54) AUTOMATIC FEEDER FOR BEADS WITH BEAD FILLERS

(75) Inventor: Takao Urayama, Tokyo (JP)

(73) Assignee: Bridgestone Corporation, Tokyo (JP)

(*) Notice: Under 35 U.S.C. 154(b), the term of this patent shall be extended for 0 days.

(21) Appl. No.: 09/154,174

(22) Filed: Sep. 16, 1998

(30) Foreign Application Priority Data

Sep. 17, 1997 (JP) .................................................. 9-252175

(51) Int. Cl.⁷ .................................................. B29D 30/48
(52) U.S. Cl. .................... 156/403; 156/131; 156/398; 156/406.2
(58) Field of Search .................... 156/131, 403, 156/396, 398, 406.2, 422

(56) References Cited

U.S. PATENT DOCUMENTS

| | | | |
|---|---|---|---|
| 3,849,231 | * 11/1974 | Brey et al. ............................. | 156/403 |
| 3,960,260 | 6/1976 | Azuma et al. . | |
| 4,553,894 | * 11/1985 | Mukae et al. ......................... | 156/403 |
| 4,581,084 | * 4/1986 | Mukae et al. ......................... | 15/131 |
| 4,790,719 | * 12/1988 | Portalupi et al. ..................... | 156/131 |
| 5,858,165 | * 1/1999 | Takasuga .............................. | 156/403 |

FOREIGN PATENT DOCUMENTS 1074138   6/1967   (GB) .

* cited by examiner

*Primary Examiner*—Geoffrey L. Knable
(74) *Attorney, Agent, or Firm*—Sughrue, Mion, Zinn, Macpeak & Seas, PLLC

(57) ABSTRACT

An automatic feeder for beads with bead fillers is provided which enables automatic feeding of beads with bead fillers to a bead setter within a tire forming machine and which enables reduction of an operator's burden and improvement of productivity. A plurality of beads with bead fillers are disposed on each of chain conveyors and in a bead stock device. The beads are delivered to a pair of bead holding portions of a bead chuck by a bead removal plate. The bead chuck is fixed to an arm portion of a conveyance robot. The bead chuck is raised, slid, and lowered due to the rotation of drive motors. A pair of beads with bead fillers is thereby supplied to a bead setter within a tire forming machine.

8 Claims, 5 Drawing Sheets

AUTOMATIC FEEDER FOR BEADS WITH BEAD FILLERS

BACKGROUND OF THE INVENTION

1. Field of the Invention

The present invention relates to an automatic feeder for beads with bead fillers. In particular it relates to an automatic feeder for beads with bead fillers which automatically supplies stocked beads with bead fillers to a bead setter within a tire forming machine.

2. Description of the Related Art

Conventionally, in the tire forming operation, when beads with bead fillers are supplied to a bead setter within a tire forming machine, an operator manually removes beads required for one tire, i.e., two beads, from a plurality of beads with bead fillers stocked in a stock means such as a stand or the like, and thereafter supplies the beads to the bead setter within the tire forming machine directly or via an intermediate device such as a conveyor or the like.

However, this operation, i.e., where the operator manually removing the beads required for one tire from the plurality of beads stocked in the stock means and supplying the beads to the bead setter within the tire forming machine, is complicated and burdensome for an operator and is less productive.

SUMMARY OF THE INVENTION

With the aforementioned in view, an object of the present invention is to provide an automatic feeder for beads with bead fillers which enables automatic feeding of beads with bead fillers to a bead setter within a tire forming machine and which enables reduction of an operator's burden and improvement of productivity.

In accordance with the present invention, the automatic feeder for beads with bead fillers, comprises: bead stock means which has two or more stock portions, each stock portion having an automatic conveying-in function (stocking function) and an automatic conveying-out function and being able to hold a plurality of beads with bead fillers; bead removal means which removes the beads with bead fillers one by one from the stock portions of the bead stock means; a bead chuck which has a pair of bead holding portions and which receives two beads with bead fillers from the bead removal means; and bead conveyance means for conveying the bead chuck from a position at which the beads with bead fillers are received from the bead removal means to a position at which the beads with bead fillers are delivered to a bead setter within a tire forming machine.

Therefore, in the bead stock means, the plurality of beads with bead fillers are held at the stock portion due to the automatic conveying-in function, and the plurality of beads with bead fillers held at the stock portion are successively conveyed out due to the automatic conveying-out function. The bead removal means removes the beads with bead fillers one by one from the stock portion of the bead stock means due to, for example, the magnetic force of the magnets of the pair of bead holding portions. The bead conveyance means conveys the bead chuck from the position at which the beads are received from the bead removal means to the position at which the beads are delivered to the bead setter within the tire forming machine. Thus, the beads with bead fillers held at the bead stock means can be automatically supplied to the bead setter within the tire forming machine. As a result, a reduction of an operator's burden and improvement of productivity can be realized. When the beads with bead fillers are removed by the bead removal means and received by the bead chuck, a known chuck mechanism may be used.

In the automatic feeder for beads with bead fillers of the present invention, in the bead stock means, while the beads with bead fillers are conveyed out of one stock portion to the bead removal means, other beads with bead fillers may be stocked at another stock portion.

Because the bead conveying-out operation and the bead conveying-in operation (stocking operation) can be effected simultaneously by the bead stock means, operational efficiency is good and productivity further improves.

In the automatic feeder for beads with bead fillers of the present invention, the bead removal means has a slide mechanism and a reversing mechanism, and the bead removal means is slid so that a first bead with a bead filler is delivered to one bead holding portion of the bead chuck, and is slid and reversed so that a second bead with a bead filler is delivered to the other bead holding portion of the bead chuck.

Therefore, the bead removal means can efficiently deliver the two beads with bead fillers to the pair of bead holding portions of the bead chuck in a short time, and productivity further improves.

In the automatic feeder for beads with bead fillers of the present invention, the bead conveyance means has a raising/lowering mechanism and a slide mechanism, and the bead conveyance means is raised and lowered so that interference between the bead chuck and the bead removal means is prevented, and the bead chuck is conveyed from a position at which the beads with bead fillers are received from the bead removal means to a position at which the beads with bead fillers are delivered to the bead setter within the tire forming machine by bead conveyance means raising, sliding, and lowering.

Therefore, the bead conveyance means can prevent interference between the bead chuck and the bead removal means and can deliver the bead chuck efficiently from the position at which the beads are received to the position at which the beads are delivered in a short time. Productivity further improves.

DESCRIPTION OF THE PREFERRED EMBODIMENTS

An automatic feeder for beads with bead fillers relating to an embodiment of the present invention will be explained hereinafter with reference to FIGS. 1 through 5.

Figure 1:
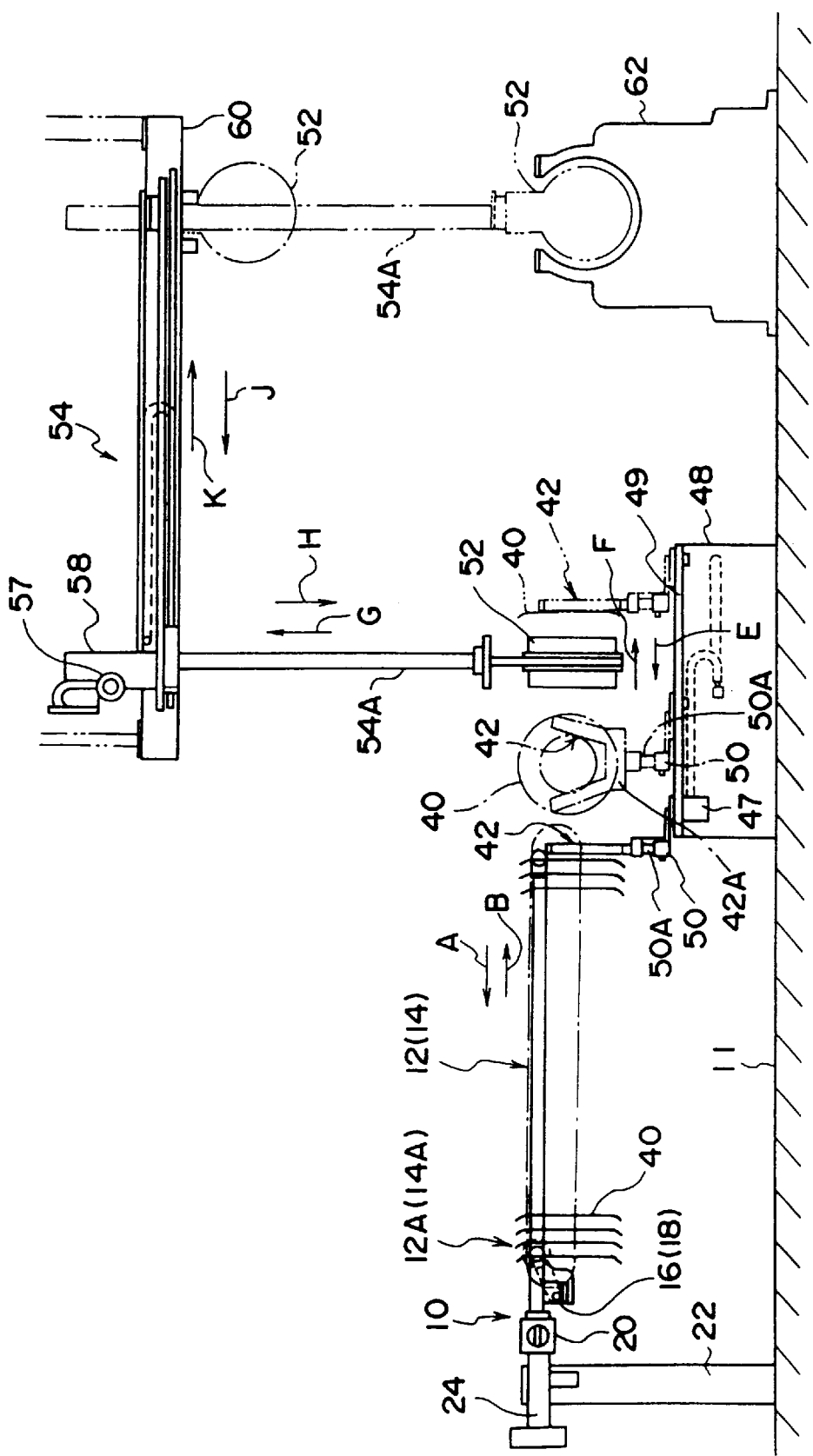
FIG. 1 is a schematic structural view which shows an automatic feeder for beads with bead fillers relating to an embodiment of the present invention.

The structure of the automatic feeder of the present embodiment will be explained first. In FIG. 1, a bead stock device 10 serving as bead stock means is disposed on a floor portion 11.

Figure 2:
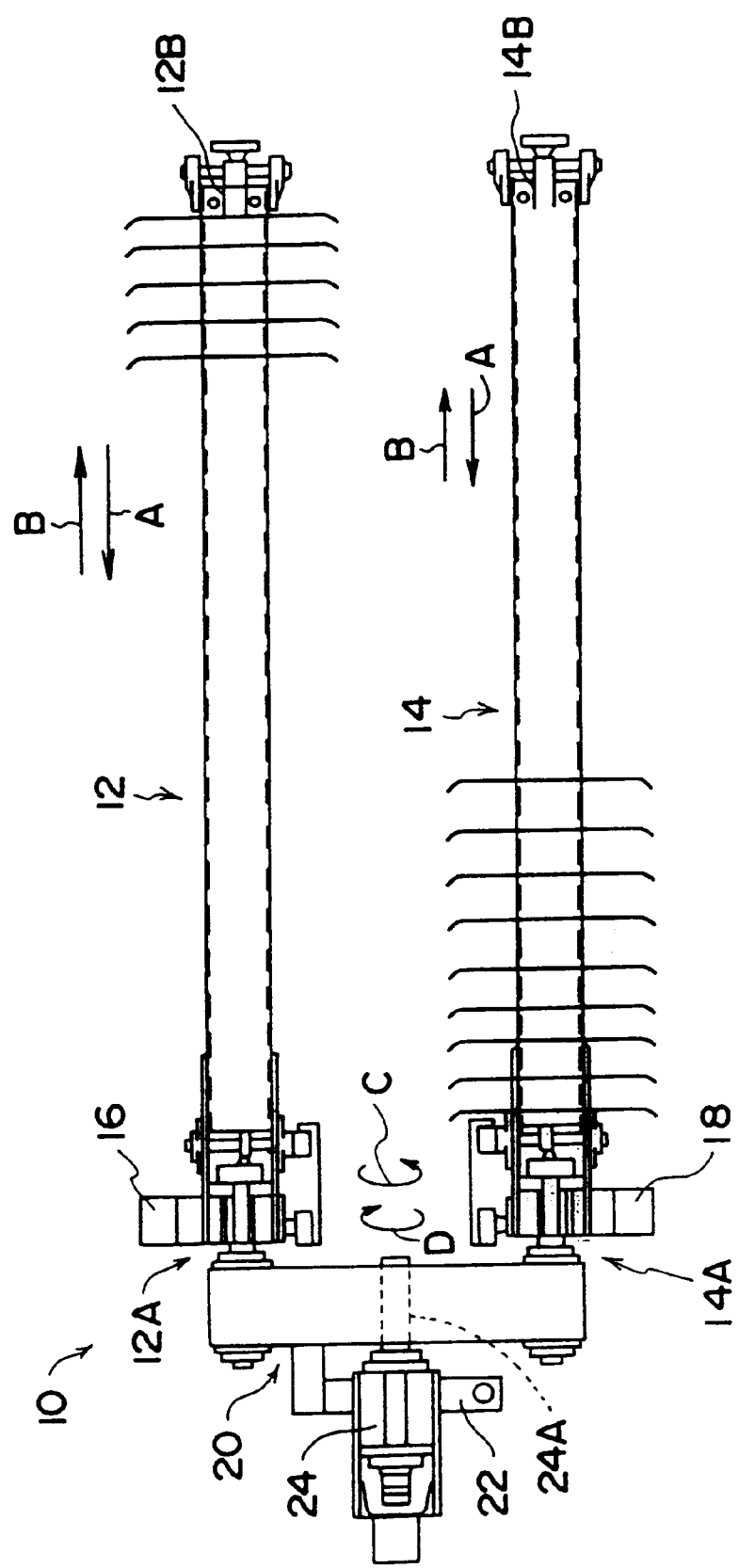
FIG. 2 is a schematic plan view which shows a bead stock device in the automatic feeder for beads with bead fillers relating to the embodiment of the present invention.

As shown in FIG. 2, the bead stock device 10 includes two chain conveyors 12 and 14 that serve as stock portions and are disposed parallel to one another and substantially at the same height. A drive motor 16 is provided at an end portion 12A of the chain conveyor 12 and a drive motor 18 is provided at an end portion 14A of the chain conveyor 14, in such a way that the chain conveyors 16 and 18 can be moved independently in a conveying-in direction (the direction of arrow A in FIG. 2) and a conveying-out direction (the direction of arrow B in FIG. 2). Further, the end portions 12A and 14A of the chain conveyors 12 and 14 are supported at a rotational portion 20. Due to the rotation of a drive motor 24 which is fixed to a supporting stand 22, the rotational portion 20 is rotatable in both directions (the direction of arrow C and the direction of arrow D) around an output shaft 24A which extends in a horizontal direction.

Accordingly, when the chain conveyor 12 is used as a conveying-out conveyor, the other chain conveyor 14 can be used as a conveying-in conveyor. Also, since the rotational portion 20 is rotated 180° around the output shaft 24A in the direction of arrow C or the direction of arrow D due to the rotation of the drive motor 24, it is easy for each of the chain conveyors 12 and 14 to move from a conveying-out position to a conveying-in position and vice-versa.

Figure 3:
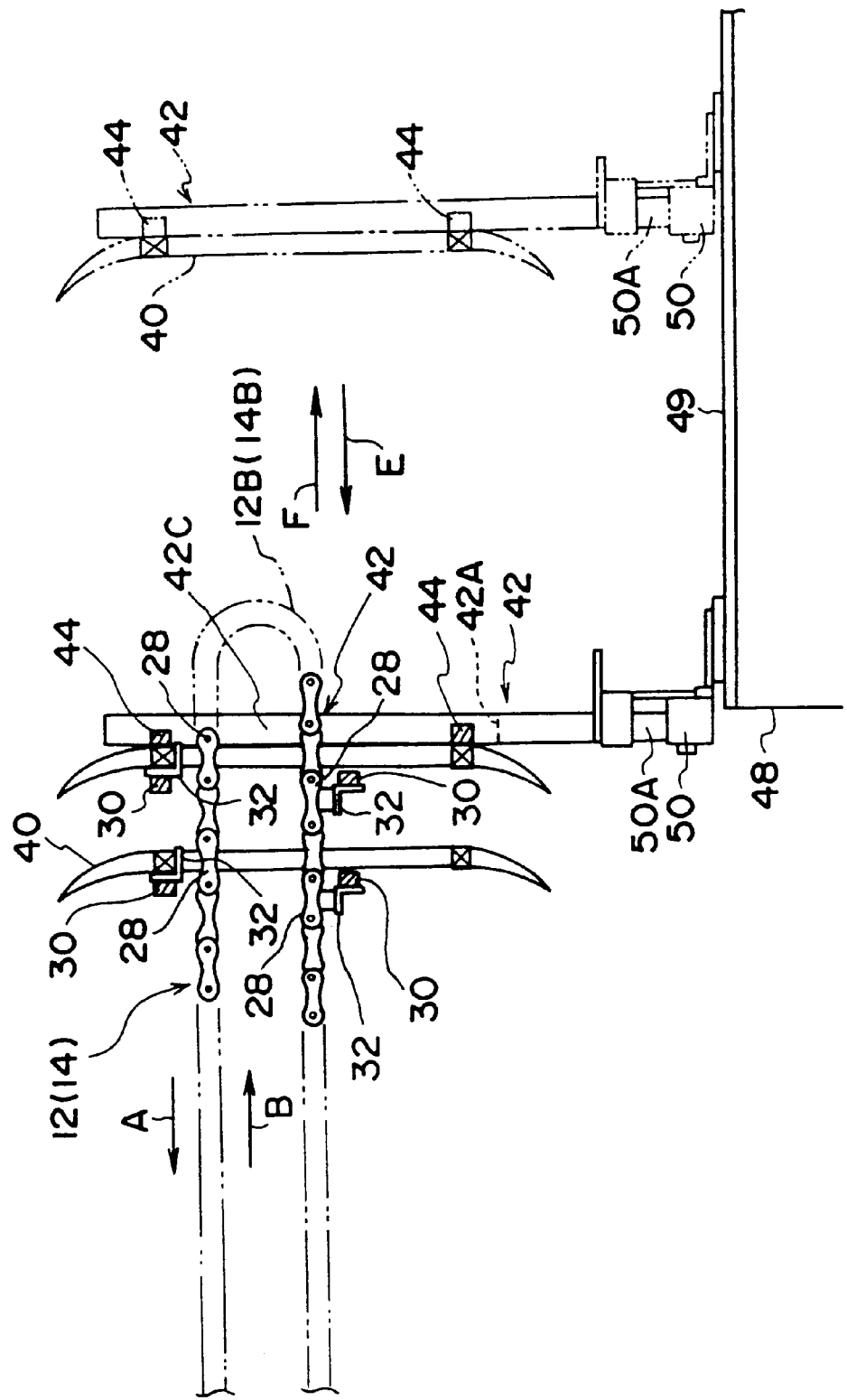
FIG. 3 is a schematic view which shows a removal plate and a portion of the bead stock device in the automatic feeder for beads with bead fillers relating to the embodiment of the present invention.

As shown in FIG. 3, an attachment 32, to which a magnet 30 is fixed, is provided at each of chains 28 of the chain conveyor 12. These attachments 32 are moved along with the chain conveyor 12.

Consequently, at the time of conveying-in operation (stocking operation), an operator disposes beads 40 with bead fillers ("bead 40 with a bead filler" will be hereinafter referred to as "bead 40") on the attachments 32 while the chain conveyor 12 is moved in the conveying-in direction (the direction of arrow A in FIG. 3). At this time, the magnets 30 attract by magnetic force the bead core portions (which are formed of, for example, steel) of the beads 40 such that the beads 40 are held on the attachments 32. On the other hand, at the time of conveying-out, when the chain conveyor 12 is moved in the conveying-out direction (the direction of arrow B in FIG. 3), the beads 40 held on the attachments 32 are moved in the conveying-out direction. Further, a bead removal plate 42 serving as a bead removal means is movably provided at a delivery position (the position shown by the solid line in FIG. 3) located in a vicinity of a distal end portion 12B of the chain conveyor 12, in which the beads 40 have been moved to the conveying-out position. The structure of the chain conveyor 14 is similar to that of the chain conveyor 12.

Figure 4:
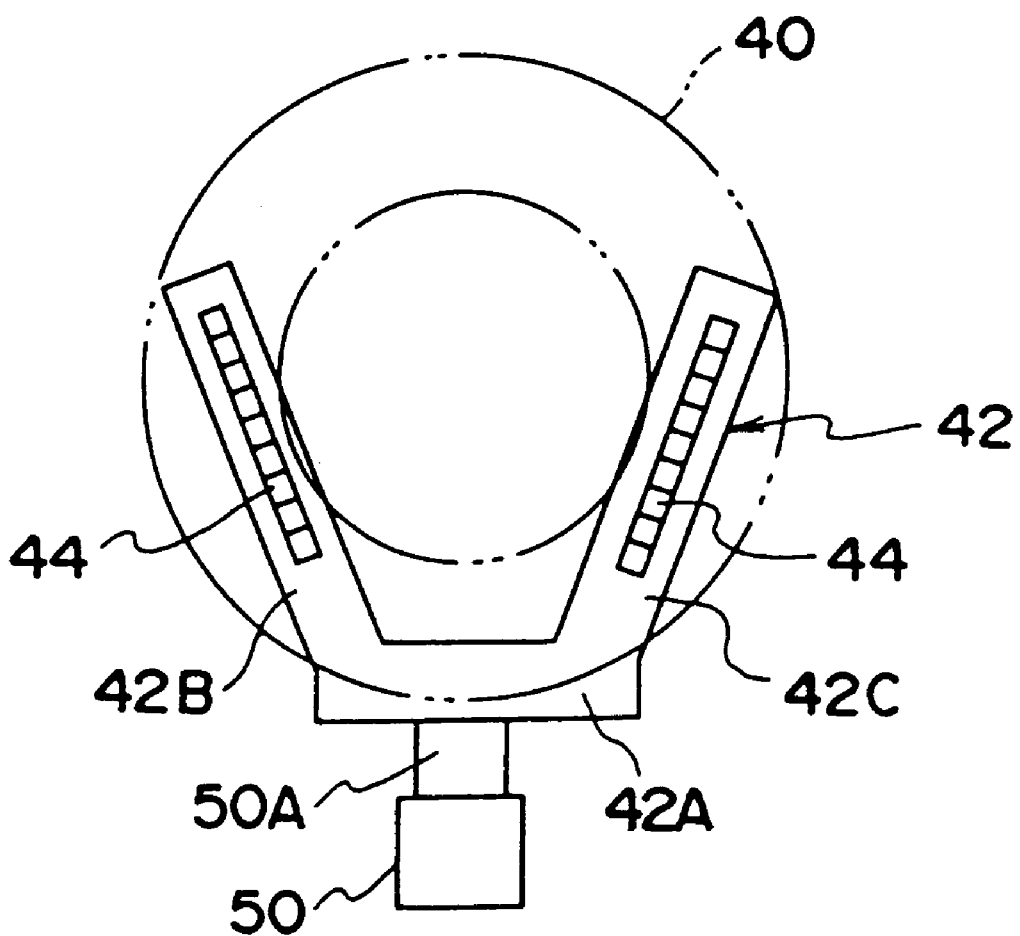
FIG. 4 is a schematic front view which shows the removal plate in the automatic feeder for beads with bead fillers relating to the embodiment of the present invention.

As shown in FIG. 4, the bead removal plate 42 includes a base portion 42A, a left side holding portion 42B, and a right side holding portion 42C. The base portion 42A extends horizontally and the holding portions 42B and 42C extend diagonally upward and outward from the end portions of the base portion 42A. A magnet 44 for holding the beads 40 is disposed at each of the holding portions 42B and 42C along the longitudinal directions thereof. The magnetic force of these magnets 44 is stronger than that of the magnet 30 of the attachment 32.

Accordingly, the beads 40 that have been conveyed to the distal end portions 12B and 14B of the chain conveyors 12 and 14 are delivered from the attachments 32 to the bead removal plate 42 due to the magnetic force of the magnets 44.

As shown in FIG. 1, due to the rotation of a drive motor 47 serving as a portion of a slide mechanism, the bead removal plate 42 is slidable in left and right directions in FIG. 1 (the direction of arrow E and the direction of arrow F in FIG. 1) along a rail 49 which serves as a portion of the slide mechanism and is provided on a base stand 48. Moreover, as shown in FIG. 4, the central portion of the base portion 42A of the bead removal plate 42 is fixed to a rotational shaft 50A of a drive motor 50 serving as a reversing mechanism. The base portion 42A and the holding portions 42B and 42C are rotated around the rotational shaft 50A due to the rotation of the drive motor 50.

As shown in FIG. 1, a bead chuck 52 is movable within the range over which the bead removal plate 42 is slidable, i.e., between a delivery position shown by the solid line and a turning-back position shown by the double-dashed chain line in FIG. 1. This bead chuck 52 is suspended from an arm portion 54A of a conveyance robot 54 serving as bead conveyance means.

Figure 5:
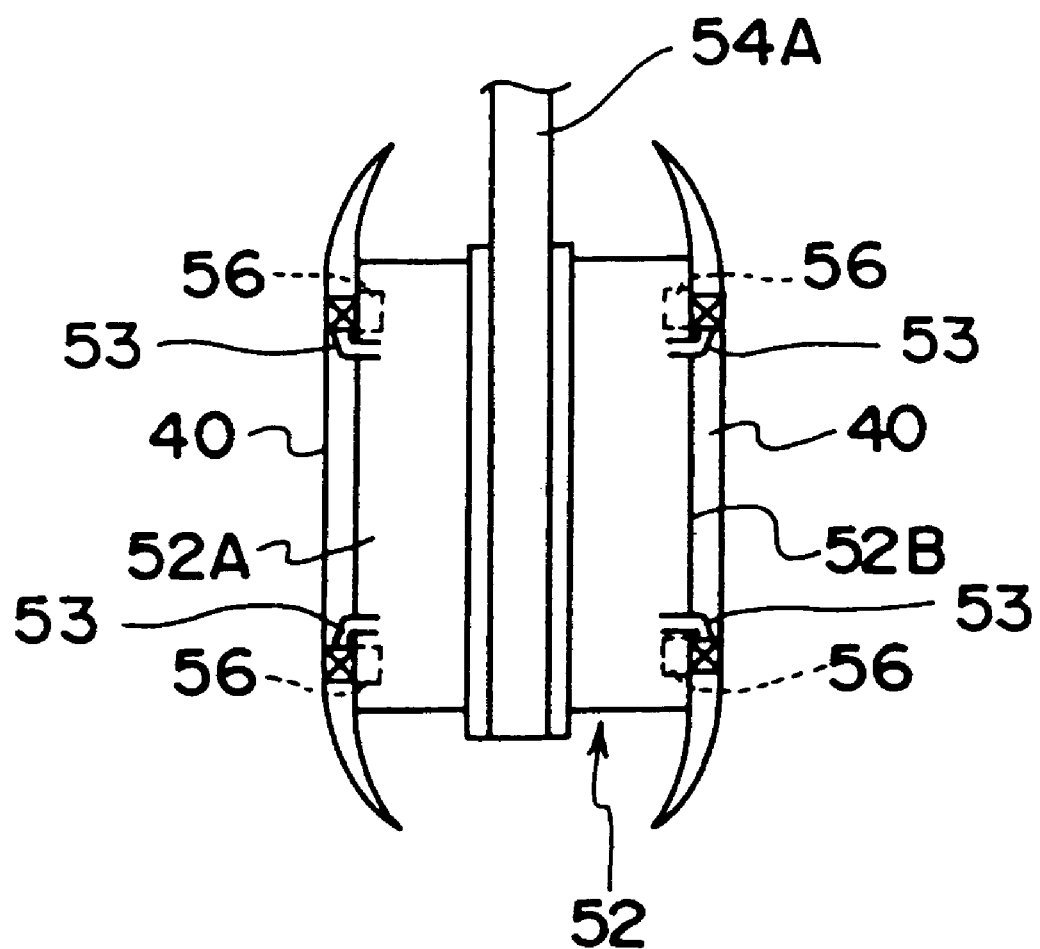
FIG. 5 is a schematic view which shows a bead chuck in the automatic feeder for beads with bead fillers relating to the embodiment of the present invention.

As shown in FIG. 5, magnets 56 are disposed at each of bead holding portions 52A and 52B which are disposed at the both sides of the bead chuck 52. The magnetic force of these magnets 56 is stronger than that of the magnets 44 of the bead removal plate 42.

Accordingly, when the bead removal plate 42 holding the bead 40 approaches the bead chuck 52, the bead 40 held at the bead removal plate 42 is delivered from the bead removal plate 42 to the bead holding portion 52A (or 52B) of the bead chuck 52 due to the magnetic force of the magnets 56. At this time, the bead chuck 52 expands pawls 53, which are built therein for holding a bead, in a radial direction to center the bead 40 in such a way that the bead 40 is reliably held at a normal position.

As shown in FIG. 1, the arm portion 54A of the conveyance robot 54 can be raised and lowered in a vertical direction (the direction of arrow G and the direction of arrow H in FIG. 1) due to the rotation of a drive motor 57 serving as a raising/lowering mechanism. When the bead removal plate 42 is slid on the base stand 48 in the left and right directions (the direction of arrow E and the direction of arrow F in FIG. 1), the arm portion 54A is retracted upwardly to avoid the interference with the bead removal plate 42.

Moreover, due to the rotation of a drive motor 58 which is a portion of the slide mechanism, the conveyance robot 54 is slidable in the left and right directions of FIG. 1 (the direction of arrow J and the direction of arrow K in FIG. 1) along a rail 60, which is a portion of the slide mechanism and is provided at a ceiling. Moreover, a tire forming machine 62 is disposed on the floor portion 11 at the lower right side of the rail 60. The conveyance robot 54 conveys the bead chuck 52, which holds the pair of beads 40, to a bead setter within the tire forming machine 62.

Next, operation of the present embodiment will be explained.

First, as shown in FIG. 2, the beads 40 are placed onto the attachments 32 provided at the chain conveyor 12 of the bead stock device 10 while the chain conveyor 12 is moved in the conveying-in direction (the direction of arrow A in FIG. 2) due to the rotation of the drive motor 16. In this way, the beads 40 are held on the attachments 32 due to the magnetic force of the magnets 30.

Next, the rotational portion 20 is rotated around the output shaft 24A 180° in the direction of arrow C or the direction of arrow D due to the rotation of the drive motor 24. The chain conveyor 12 is thus moved from the conveying-in position (the position of the chain conveyor 12 in FIG. 2) to the conveying-out position (the position of the chain conveyor 14 in FIG. 2).

In this state, the chain conveyor 12 of the bead stock device 10 is moved in the conveying-out direction (the direction of arrow B in FIG. 2) due to the rotation of the drive motor 16, and the attachment 32, on which the bead 40 is disposed, is moved to the distal end portion 12B of the chain conveyor 12. At the same time, due to the rotation of the drive motor 47, the bead removal plate 42 is slid on the base stand 48 along the rail 49 to the delivery position in a vicinity of the distal end portion 12B of the chain conveyor 12. As a result, the bead 40 disposed on the attachment 32 is delivered from the attachment 32 to the bead removal plate 42 due to the magnetic force of the magnets 44.

Thereafter, the bead removal plate 42 is slid in the direction of arrow F in FIG. 1 due to the rotation of the drive motor 47 and is stopped at the turning-back position shown by a double-dashed chain line in FIG. 1. At this time, the bead chuck 52 is retracted upwardly and does not interfere with the bead removal plate 42.

Next, the bead removal plate 42 is slid in the direction of arrow E in FIG. 1 due to the rotation of the drive motor 47. Also, the arm portion 54A of the conveyance robot 54 is moved (lowered) in the direction of arrow H due to the rotation of the drive motor 57, and the bead removal plate 42 and the bead chuck 52 are stopped at the delivery position. As a result, the bead removal plate 42, which holds the bead 40, approaches the bead chuck 52, and the bead 40 held at the bead removal plate 42 is delivered from the bead removal plate 42 to the bead holding portion 52B of the bead chuck 52 due to the magnetic force of the magnets 56. The bead 40 is reliably held at the normal position by the bead holding pawls 53 provided at the bead chuck 52.

Thereafter, the bead removal plate 42 is slid to the delivery position provided at the distal end portion 12B of the chain conveyor 12 due to the rotation of the drive motor 47. As a result, the bead 40 disposed on the attachment 32 is delivered from the attachment 32 to the bead removal plate 42 due to the magnetic force of the magnets 44. At this time, the bead chuck 52 is retracted upwardly and does not interfere with the bead removal plate 42. Moreover, the chain conveyor 12 of the bead stock device 10 is moved in the conveying-out direction (the direction of arrow B in FIG. 2) due to the rotation of the drive motor 16, and the subsequent attachment 32, on which the bead 40 is disposed, is moved to the distal end portion 12B of the chain conveyor 12.

Afterwards, the bead removal plate 42 is slid a predetermined distance in the direction of arrow F in FIG. 1 due to the rotation of the drive motor 47 and is rotated 180° due to the rotation of the drive motor 50 in a reversing position shown by a chain line in FIG. 1 (the chain line in FIG. 1 shows a state in which the bead removal plate 42 is in the middle of rotation). Further, the bead removal plate 42 is slid in the direction of arrow F in FIG. 1. At the same time, the arm portion 54A of the conveyance robot 54 is moved (lowered) in the direction of arrow H due to the rotation of the drive motor 57 and the bead removal plate 42 and the bead chuck 52 are stopped at the delivery position. As a result, the bead removal plate 42 which holds the bead 40 approaches the bead chuck 52, and the bead 40 held at the bead removal plate 42 is delivered from the bead removal plate 42 to the bead holding portion 52A of the bead chuck 52 due to the magnetic force of the magnets 56. The bead 40 is reliably held at the normal position by the bead holding pawls 53 provided at the bead chuck 52.

In this way, when the pair of beads 40 are held at the bead holding portions 52A and 52B of the bead chuck 52, the arm portion 54A of the conveyance robot 54 is operated due to the rotation of the drive motor 57 and moves (raises) the bead chuck 52 in the direction of arrow G in FIG. 1. In a state in which the bead chuck 52 is raised, due to the rotation of the drive motor 58, the conveyance robot 54 slides the bead chuck 52 toward the right in FIG. 1 (in the direction of arrow K in FIG. 1) along the rail 60 provided at the ceiling. Thereafter, the arm portion 54A of the conveyance robot 54 moves (lowers) the bead chuck 52 in the direction of arrow H in FIG. 1 from the raised position shown by a chain line in FIG. 1 due to the rotation of the drive motor 57. Then, the arm portion 54A moves the bead chuck 52 to the delivery position (the position shown by a double-dashed chain line in FIG. 1) of the bead setter within the tire forming machine 62 disposed at the lower right side of the rail 60. The pair of beads 40 are thereby supplied to the bead setter.

Accordingly, when the automatic feeder for beads with bead fillers of the present embodiment is used, the beads 40 can be automatically supplied to the bead setter within the tire forming machine 62. A reduction of an operator s burden and improvement of productivity can be realized.

Moreover, in the bead stock device 10 of the present embodiment, when the one chain conveyor 12 is used as a conveying-out conveyor, the other chain conveyor 14 can be used as a conveying-in conveyor. Because the bead conveying-out operation and the bead conveying-in operation are effected simultaneously, operational efficiency is good and productivity further improves.

Further, in the present embodiment, the bead removal plate 42 is slid so that a bead 40 is conveyed to one of the bead holding portions of the bead chuck 52, i.e., bead holding portion 52A, and is slid and reversed so that another bead 40 is conveyed to the other bead holding portion 52B of the bead chuck 52. Consequently, two beads 40 can be delivered efficiently to the pair of bead holding portions 52A and 52B of the bead chuck 52 in a short time and productivity further improves.

Further, in the present embodiment, the bead chuck 52 is raised and lowered by the conveyance robot 54 so that interference between the bead chuck 52 and the bead removal plate 42 is prevented. Also, the bead chuck 52 is conveyed from the bead receiving position to the bead delivery position by being raised, slid, and lowered. Therefore, interference between the bead chuck 52 and the bead removal plate 42 can be prevented, and the bead chuck 52 can be conveyed efficiently from the bead receiving position to the bead delivery position in a short time. Productivity further improves.

The present invention has been described in detail herein with reference to a specific embodiment. However, it is obvious that the present invention is not limited to the embodiment and that various other embodiments are possible within the scope of the present invention. For example, in the present embodiment, the magnetic forces of the magnets 30, 44, and 56 are varied and the bead 40 is delivered on the basis of the strengths of the magnetic forces. Instead, the magnets 30, 44, and 56 may be electromagnets and the bead 40 may be delivered by turning on/off the magnets 30, 44, and 56. Further, in the present embodiment, the two chain conveyors 12 and 14 are provided in the bead stock device 10. However, three or more chain conveyors may be provided in the bead stock device 10.

What is claimed is:

1. An automatic feeder for beads with bead fillers, comprising:

bead stock means having two or more stock portions, each stock portion rotating to have an automatic continuous conveying-in function and an automatic continuous conveying-out function and each being able to hold a plurality of beads with bead fillers;

bead removal means for removing the beads with bead fillers one by one from the stock portions of said bead stock means;

a bead chuck having a pair of bead holding portions which receives two beads with bead fillers from said bead removal means;

bead conveyance means for conveying said bead chuck from a position at which the beads with bead fillers are received from said bead removal means to a position at which the beads with bead fillers are delivered to a bead setter within a tire forming machine; and a rotation portion for said bead stock means, such that while the beads with bead fillers are conveyed out of one stock portion to said bead removal means, other beads with bead fillers may be stocked at another stock portion, wherein while the beads with bead fillers are conveyed out of one stock portion of the two or more stock portions by the conveying-out function thereof to said bead removal means, other beads with bead fillers are stocked at another stock portion of the two or more stock portions by the conveying-in function thereof, and when all of the beads with bead fillers are conveyed out of the one stock portion, a rotation of the two or more stock portions is automatically carried out such that the one stock portion moves to a position at which beads with bead fillers can be stocked by the conveying-in function thereof and one of other stock portions in which other beads with bead fillers are set moves to a position at which the other beads with bead fillers can be conveyed out of the one of the other stock portions by the conveying-out function thereof to said bead removal means.

2. An automatic feeder for beads with bead fillers according to claim 1, wherein said bead removal means has a slide mechanism and a reversing mechanism, and said bead removal means is slid so that a bead with a bead filler is delivered to one bead holding portion of said bead chuck, and is slid and reversed so that another bead with a bead filler is delivered to the other bead holding portion of said bead chuck.

3. An automatic feeder for beads with bead fillers according to claim 1, wherein said bead conveyance means has a raising/lowering mechanism and a slide mechanism, and said bead conveyance means is raised and lowered so that interference between said bead chuck and said bead removal means is prevented, and said bead chuck is conveyed from a position at which the beads with bead fillers are received from said bead removal means to a position at which the beads with bead fillers are delivered to the bead setter within the tire forming machine by bead conveyance means raising, sliding, and lowering.

4. An automatic feeder for beads with bead fillers according to claim 1, wherein:

said bead removal means has magnets, and the beads with bead fillers are removed from the stock portions of said bead stock means due to the magnetic force of the magnets; and the bead holding portions of said bead chuck have magnets, and the beads with bead fillers are received from said bead removal means due to the magnetic force of the magnets.

5. An automatic feeder for beads with bead fillers according to claim 1, wherein said rotation portion is operably coupled to said stock portions at the same ends thereof, said rotation portion including a motor to reverse the position of said stock portions by 180° such that a stock portion used for conveying in is positioned for conveying out beads with fillers while simultaneously a stock portion used for conveying out is positioned for conveying in beads with fillers.

6. An automatic feeder to beads with bead fillers according to claim 1, wherein said bead removal means comprises a plate mounted on a base for reciprocation, said plate holding a bead with bead fillers on one side of said plate with rotation so that delivery can be made to both sides of said bead chuck.

7. An automatic feeder for beads with fillers according to claim 6, further comprising a motor for moving said plate and base from a position where beads with fillers are removed from said stock portion to positions where said beads with filler are transferred to said bead chuck.

8. An automatic feeder for beads with fillers according to claim 1, wherein said bead chuck comprises an arm portion and a pair of bead holding portions, one on each side of said arm portion, each bead holding portion having magnets to attract beads for holding and movable pawls to center a bead relative to said magnets.

* * * * *